(12) United States Patent  (10) Patent No.: US 9,071,093 B2
Chang et al.  (45) Date of Patent: Jun. 30, 2015

(54) BASE STRUCTURE FOR COOLING FAN

(71) Applicant: Asia Vital Components Co., Ltd., Sinjhuang District, New Taipei (TW)

(72) Inventors: Bor-Haw Chang, New Taipei (TW); Ping-Tsang Ho, New Taipei (TW); Cheng-Chuan Hsu, New Taipei (TW); Hung-Yi Hsu, New Taipei (TW)

(73) Assignee: ASIA VITAL COMPONENTS (CHINA) CO., LTD., Shenzhen City (CN)

( * ) Notice: Subject to any disclaimer, the term of this patent is extended or adjusted under 35 U.S.C. 154(b) by 171 days.

(21) Appl. No.: 13/726,185

(22) Filed: Dec. 23, 2012

(65) Prior Publication Data

US 2014/0175954 A1 Jun. 26, 2014

(51) Int. Cl.
H02K 5/16 (2006.01)
H02K 5/22 (2006.01)
H02K 5/167 (2006.01)
H02K 11/00 (2006.01)

(52) U.S. Cl.
CPC .......... *H02K 5/16* (2013.01); *H02K 5/225* (2013.01); *H02K 5/1675* (2013.01); *H02K 5/22* (2013.01); *H02K 11/0073* (2013.01)

(58) Field of Classification Search
USPC ............... 310/67 R, 90, 91; 417/420, 354
See application file for complete search history.

(56) References Cited

U.S. PATENT DOCUMENTS

| | | | | |
|---|---|---|---|---|
| 5,020,928 | A * | 6/1991 | Akiyama et al. | 400/193 |
| 6,081,056 | A * | 6/2000 | Takagi et al. | 310/89 |
| 6,617,736 | B1 * | 9/2003 | Horng et al. | 310/91 |
| 6,654,213 | B2 * | 11/2003 | Horng et al. | 361/23 |
| 7,608,960 | B2 * | 10/2009 | Yang et al. | 310/91 |
| 7,622,838 | B2 * | 11/2009 | Watanabe et al. | 310/91 |
| 7,737,589 | B2 * | 6/2010 | Sekiguchi et al. | 310/90 |
| 7,755,240 | B2 * | 7/2010 | Yang et al. | 310/91 |
| 2002/0063494 | A1 * | 5/2002 | Yoshikawa et al. | 310/261 |
| 2002/0079754 | A1 * | 6/2002 | Lai | 310/67 R |
| 2002/0101124 | A1 * | 8/2002 | Horng | 310/91 |

* cited by examiner

*Primary Examiner* — Naishadh Desai

(57) ABSTRACT

A base structure for cooling fan includes a seat, a circuit board and a motor assembly. The seat has an inner side served as a supporting surface. The circuit board has a first side attached to a top of the supporting surface and an opposite second side having a plurality of electronic elements provided thereon. The motor assembly includes a plurality of stacked silicon steel plates located on the circuit board and above the electronic elements. With the first side of the circuit board being attached to the supporting surface of the seat and the electronic elements on the second side of the circuit board being located in spaces between the motor assembly and the circuit board, more silicon steel plates can be stacked in the motor assembly to enable upgraded motor working efficiency and reduced electric current needed by the cooling fan to operate.

4 Claims, 4 Drawing Sheets

US 9,071,093 B2

BASE STRUCTURE FOR COOLING FAN

FIELD OF THE INVENTION

The present invention relates to a base structure for cooling fan, and more particularly to a base structure for cooling fan that allows more stacked silicon steel plates in a motor assembly to thereby enable upgraded motor working efficiency and reduced electric current needed by the cooling fan to operate.

BACKGROUND OF THE INVENTION

Thanks to the recent quick development in the electronic industry, various kinds of electronic elements now have largely upgraded performance and constantly increased computing and data processing speed. In response to the constantly increased computing speed, the number of chips in the electronic elements also increases. The large number of chips produces more heat during operation thereof, and the produced heat must be timely removed or dissipated to avoid reverse influences on the electronic elements, such as lowered computing and data processing speed. Accumulated heat in the electronic elements would even burn out the electronic elements. Therefore, heat dissipation of electronic elements has already become a very important issue in the electronic industry. One of the most common ways for dissipating the heat produced by the electronic elements is the use of a cooling fan.

For example, when a computer operates, the central processing unit (CPU) thereof would produce a high amount of heat to have a raised temperature, which will cause an unstable state of the CPU and accordingly, a crashed computer or even a burned-out CPU. It is therefore very important for the cooling fan to quickly guide heat out of the CPU and other heat-producing electronic elements.

In view of the largely reduced thickness of currently designed computers, the cooling fan for dissipating heat from a slim-type computer must be able to guide airflow quickly and have a low profile. Since the overall height of a cooling fan has close relation with the heights of the fan's motor, circuit board and many other electronic elements, it is also very important in designing the fan's overall thickness.

FIG. 1 is a partial sectional view of a conventional cooling fan 1. As shown, the cooling fan 1 includes a seat 11 and a motor assembly 12. The seat 11 is provided with a forward projected hollow bearing cup 111 for receiving a bearing 112 therein. The motor assembly 12 is located around an outer side of the bearing cup 111, and includes a plurality of silicon steel plates 121, one or more insulating frames 122 and a circuit board 123. The silicon steel plates 121 and the insulating frames 122 are wound around by coils and are located on the circuit board 123. That is, the motor assembly 12 is mounted on the seat 11 via the circuit board 123. A space is left between the seat 11 and the circuit board 123 for accommodating a plurality of electronic elements 1231 of the circuit board 123. While the cooling fan 1 has a limited overall height, the motor assembly 12 has occupied a large part of an inner space of the cooling fan 1 and a space must be left between the circuit board 123 and the seat 11 for the electronic elements 1231. As a result, the remaining space in the cooling fan can only allow for a reduced number of silicon steel plates 121. However, with the reduced number of silicon steel plates 121, the motor assembly 12 would have lowered working efficiency and the cooling fan 1 would need increased electric current to operate.

In brief, the conventional cooling fan has the following disadvantages: (1) providing only limited space for stacking limited number of silicon steel plates in the motor assembly; (2) low motor working efficiency; and (3) increased electric current needed by the cooling fan to operate.

It is therefore tried by the inventor to develop an improved base structure for cooling fan, in order to overcome the disadvantages in the conventional cooling fan.

SUMMARY OF THE INVENTION

A primary object of the present invention is to provide a base structure for cooling fan that allows more stacked silicon steel plates in a motor assembly to thereby enable upgraded motor working efficiency and reduced electric current needed by the cooling fan to operate.

To achieve the above and other objects, the base structure for cooling fan according to the present invention includes a seat, a circuit board and a motor assembly. The seat has an inner side served as a supporting surface and a bearing cup is forward extended from a predetermined position on the supporting surface. The circuit board is arranged on a top of the supporting surface, and has a first side and an opposite second side; the first side of the circuit board is attached to the top of the supporting surface, and the second side has a plurality of electronic elements provided thereon. The motor assembly is fitted around an outer side of the bearing cup to locate on the circuit board and above the electronic elements, and includes a plurality of silicon steel plates. Since the first side of the circuit board is attached to the top of the supporting surface and the electronic elements on the second side of the circuit board are located in spaces in the motor assembly to occupy less room in the cooling fan, more layers of silicon steel plates can be stacked in the motor assembly. With the increased number of silicon steel plates, the motor assembly can have upgraded working efficiency and the electric current needed by the cooling fan to operate can be reduced.

In brief, the base structure for cooling fan according to the present invention has the following advantages: (1) providing increased space for stacking more layers of silicon steel plates in the motor assembly; (2) enabling upgraded motor working efficiency; and (3) enabling reduced electric current needed by the cooling fan to operate.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
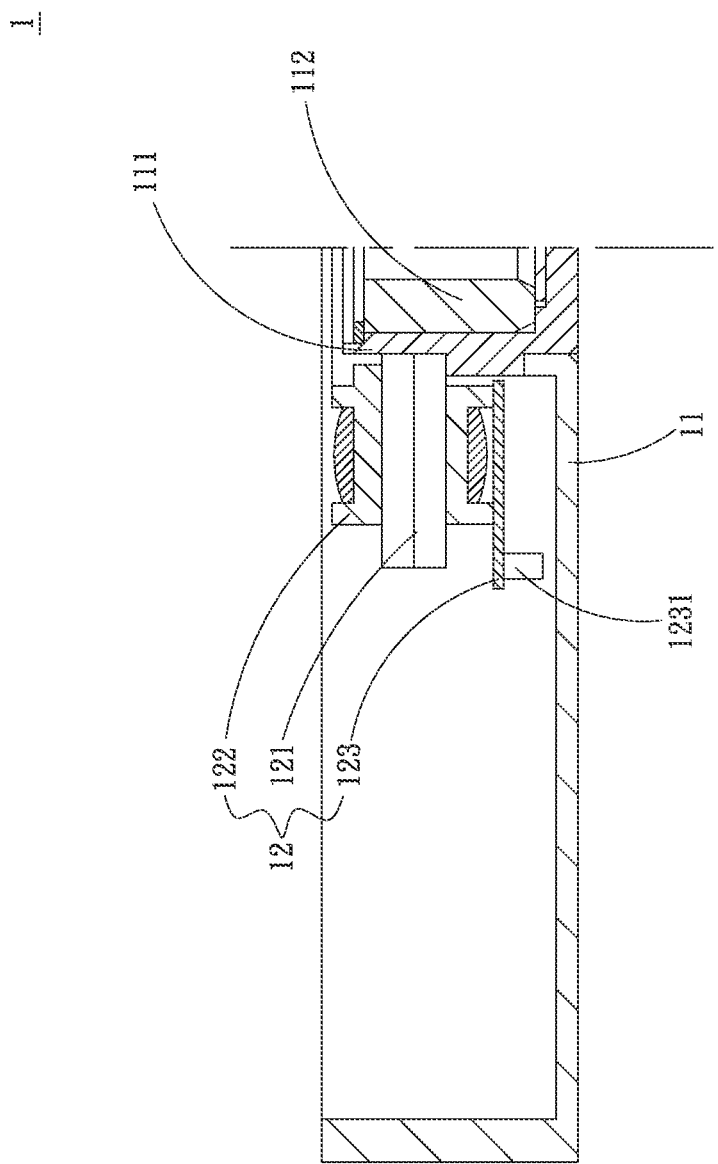
FIG. 1 is a partial sectional view of a conventional cooling fan.

The present invention will now be described with some preferred embodiments thereof and with reference to the accompanying drawings. For the purpose of easy to understand, elements that are the same in the preferred embodiments are denoted by the same reference numerals.

Figure 2:
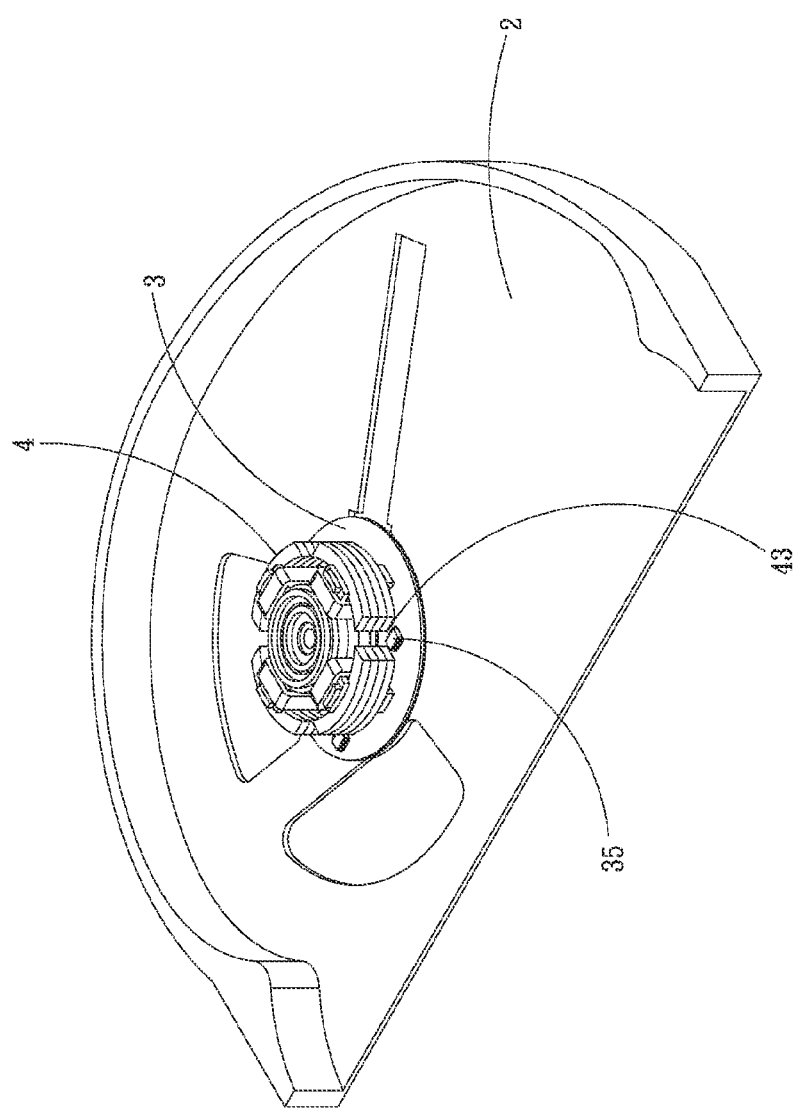
FIG. 2 is a perspective view of a base structure for cooling fan according to a first preferred embodiment of the present invention.
Figure 3:
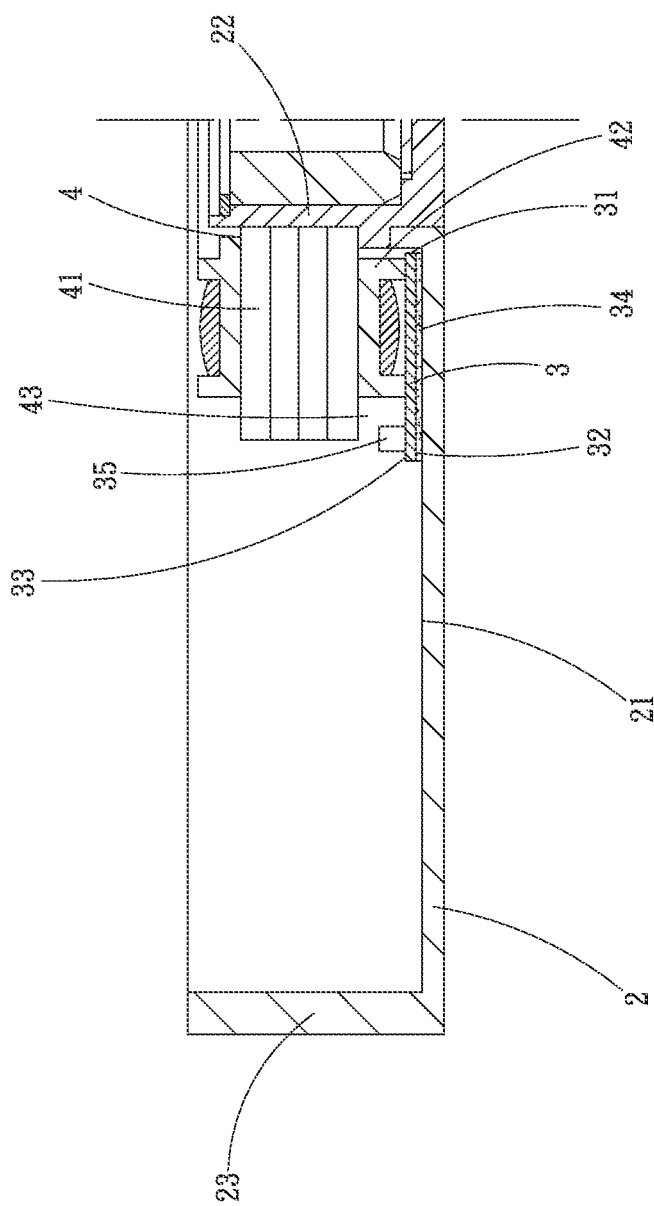
FIG. 3 is a partial sectional view of the base structure for cooling fan according to the first preferred embodiment of the present invention.

Please refer to FIGS. 2 and 3 that are perspective and partial sectional views, respectively, of a base structure for cooling fan according to a first preferred embodiment of the present invention. As shown, the base structure for cooling fan includes a seat 2, a circuit board 3 and a motor assembly 4. The seat 2 has an inner side served as a supporting surface 21 and a bearing cup 22 is forward extended from a predetermined position of the supporting surface 21. The seat 2 also has at least one side wall 23 perpendicularly extended from the supporting surface 21 along a peripheral edge of the seat 2. In the illustrated first preferred embodiment, the side wall 23 is extended along part of the peripheral edge of the seat 2. However, it is understood the arrangement of the side wall 23 is not necessarily limited to the above manner.

The circuit board 3 is arranged on a top of the supporting surface 21, and includes a through hole 31 formed at a position corresponding to the bearing cup 22, so that the bearing cup 22 forward extends through the through hole 31 and the circuit board 3 is located around an outer side of the bearing cup 22. The circuit board 3 has a first side 32 and an opposite second side 33. The first side 32 of the circuit board 3 is attached to the top of the supporting surface 21. A gum-backed insulating sheet 34 is provided between the first side 32 of the circuit board 3 and the supporting surface 21, so that the circuit board 3 is fixedly located on the supporting surface 21 while being electrically insulated from the seat 2. On a top of the second side 33 of the circuit board 3, there is provided a plurality of electronic elements 35, which are raised in a direction the same as that in which the bearing cup 22 extends.

The motor assembly 4 is arranged on the top of the second side 33 of the circuit board 3, and includes a plurality of stacked silicon steel plates 41 and one or more insulating frames 42. The insulating frames 42 are located at upper and lower sides of the stacked silicon steel plates 41, so that the insulating frames 42 and the silicon steel plates 41 are together fitted around the outer side of the bearing cup 22. The insulating frames 42 are mounted on the top of the circuit board 3, such that at least one space 43 is left between any two circumferentially adjacent insulating frames 42 and between the insulating frames 42 and the circuit board 3. The electronic elements 35 provided on the second side 33 of the circuit board 3 are located in the spaces 43.

The side wall 23 of the seat 2 is perpendicularly extended from the supporting surface 21 by a predetermined height; and the motor assembly 4 formed of the stacked silicon steel plates 41 and the insulating frames 42 can only have a largest possible overall height equal to that of the side wall 23. In the first preferred embodiment of the present invention, since the first side 32 of the circuit board 3 is attached to the top of the supporting surface 21 and the electronic elements 35 on the second side 33 of the circuit board 3 are located in the spaces 43, there is an increased space available between the upper and the lower insulating frames 42 for stacking more layers of silicon steel plates 41 therein. With the increased number of silicon steel plates 41, the motor assembly 4 can have upgraded working efficiency and the electric current needed by the cooling fan to operate can be reduced.

Figure 4:
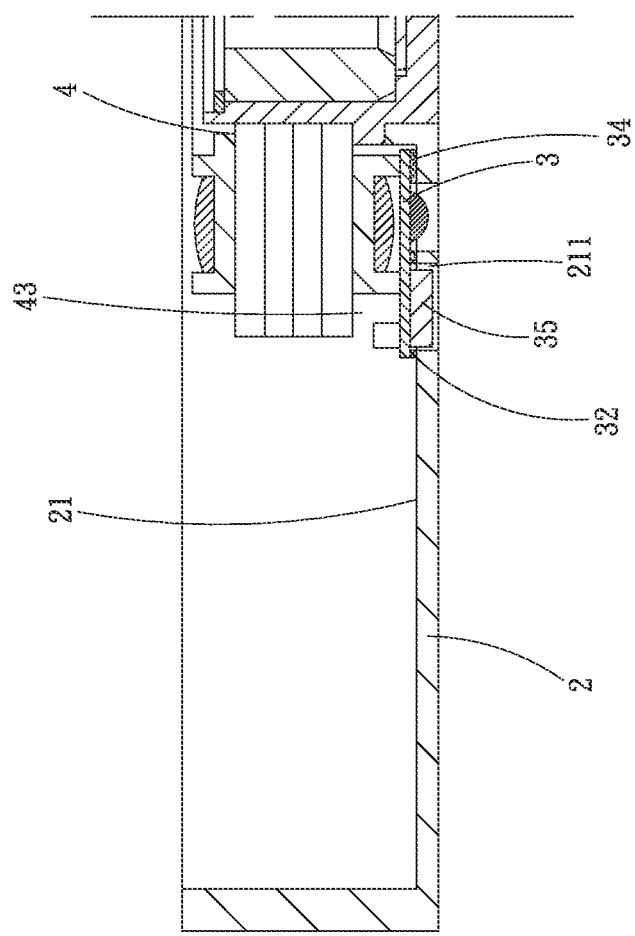
FIG. 4 is a partial sectional view of the base structure for cooling fan according to a second preferred embodiment of the present invention.

FIG. 4 is a partial sectional view of the base structure for cooling fan according to a second preferred embodiment of the present invention. As shown, the second preferred embodiment is generally structurally similar to the first preferred embodiment, except that, in the second preferred embodiment, the seat 2 is provided on the supporting surface 21 with at least one or more holes 211, the circuit board 3 is further provided on its first side 32 at positions corresponding to the holes 211 with additional electronic elements 35, and portions of the gum-backed insulating sheet 34 corresponding to the holes 211 are removed to allow the additional electronic elements 35 to extend therethrough to locate in the holes 211. The second preferred embodiment is further different from the first preferred embodiment in that a plurality of connection wires (not shown) is electrically connected at one ends to the first side 32 of the circuit board 3 with another ends thereof extending through the holes 211 and the removed portions of the gum-backed insulating sheet 34 to an outer side of the seat 2. In the second preferred embodiment, since the first side 32 of the circuit board 3 is attached to the top of the supporting surface 21 and the electronic elements 35 on the second side 33 of the circuit board 3 are located in the spaces 43, there is an increased space available between the upper and the lower insulating frames 42 for stacking more layers of silicon steel plates 41 therein. With the increased number of silicon steel plates 41, the motor assembly 4 can have upgraded working efficiency and the electric current needed by the cooling fan to operate can be reduced.

According to the present invention, the seat 2 can be made of a metal material or a plastic material. In the illustrated preferred embodiments of the present invention, the seat 2 is made of a metal material. When the circuit board 3 is arranged on the supporting surface 21 of the seat 2, heat produced by the electronic elements 35 on the circuit board 3 during operation can be transferred to the seat 2 for dissipating into ambient air.

The present invention has been described with some preferred embodiments thereof and it is understood that many changes and modifications in the described embodiments can be carried out without departing from the scope and the spirit of the invention that is intended to be limited only by the appended claims.

What is claimed is:
1. A base structure for cooling fan, comprising:
a seat having an inner side served as a supporting surface and a bearing cup being forward extended from a predetermined position on the supporting surface, wherein the seat is provided with a plurality of holes at predetermined positions on the supporting surface;
a circuit board being arranged on a top of the supporting surface, and having a first side and an opposite second side; the first side of the circuit board being attached to the top of the supporting surface, and the second side having a plurality of electronic elements provided thereon;
a gum-backed insulating sheet provided between the first side of the circuit board and the supporting surface of the seat, wherein the circuit board is provided on the first side with additional electronic elements, which are correspondingly located in the holes on the supporting surface; and wherein the circuit board is provided on the first side with a plurality of connection wires; and the connecting wires having one ends electrically connected to the circuit board and another ends extended through the holes on the supporting surface to an outer side of the seat, wherein portions of the gum-backed insulating sheet corresponding to the holes on the supporting surface are removed to allow the additional electronic elements and the connection wires to extend therethrough into the holes on the supporting surface; and
a motor assembly including a plurality of silicon steel plates; and the motor assembly being fitted around an outer side of the bearing cup to locate on the circuit board and above the electronic elements.

2. The base structure for cooling fan as claimed in claim 1, wherein the motor assembly further includes one or more insulating frames; at least one space being left between any two circumferentially adjacent insulating frames and between the insulating frames and the circuit board, and the electronic elements being located in the spaces.

3. The base structure for cooling fan as claimed in claim 1, wherein the circuit board is provided with a through hole, such that the bearing cup forward extends through the through hole and the circuit board is located around the bearing cup.

4. The base structure for cooling fan as claimed in claim 1, wherein the seat includes at least one side wall perpendicularly extended from the supporting surface along a peripheral edge of the seat.

\* \* \* \* \*